United States Patent
Lin

(10) Patent No.: US 12,101,193 B2
(45) Date of Patent: Sep. 24, 2024

(54) METHODS AND DEVICES FOR DOWNLINK FEEDBACK INDICATION PROCESSING

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 225 days.

(21) Appl. No.: 17/700,368

(22) Filed: Mar. 21, 2022

(65) Prior Publication Data

US 2022/0216954 A1  Jul. 7, 2022

Related U.S. Application Data

(63) Continuation of application No. PCT/IB2019/001104, filed on Sep. 24, 2019.

(51) Int. Cl.
*H04L 1/18* (2023.01)
*H04L 1/1829* (2023.01)

(52) U.S. Cl.
CPC .................. *H04L 1/1851* (2013.01)

(58) Field of Classification Search
CPC ... H04L 1/1864; H04L 1/1812; H04L 1/1861; H04L 5/0055; H04L 1/1671; H04L 5/0051; H04L 5/0092; H04L 5/0094; H04L 5/22; H04L 1/1822; H04L 5/001; H04L 5/0035; H04L 5/0007; H04L 5/0026; H04W 72/12; H04W 72/04; H04W 72/23; H04B 7/024
See application file for complete search history.

(56) References Cited

U.S. PATENT DOCUMENTS

| | | | |
|---|---|---|---|
| 8,639,239 B2 * | 1/2014 | Uemura | H04W 36/0088 455/67.11 |
| 9,084,148 B2 * | 7/2015 | Uemura | H04W 24/08 |
| 9,338,591 B1 * | 5/2016 | Vivanco | H04W 36/0088 |
| 10,200,942 B2 * | 2/2019 | Uchiyama | H04W 48/16 |
| 10,652,805 B2 * | 5/2020 | Uchiyama | H04W 24/10 |
| 10,880,065 B2 * | 12/2020 | Yin | H04W 72/12 |
| 2009/0274139 A1 | 11/2009 | Palanki | |

(Continued)

FOREIGN PATENT DOCUMENTS

| CN | 102017508 A | 4/2011 |
|---|---|---|
| EP | 2274859 A2 | 1/2011 |

(Continued)

OTHER PUBLICATIONS

Notice of Rejection of the Japanese application No. 2022-543803, issued on Oct. 17, 2023, 6 pages with English translation.

(Continued)

*Primary Examiner* — Jung Liu
(74) *Attorney, Agent, or Firm* — PERKINS COIE LLP

(57) ABSTRACT

A method for downlink feedback indication processing perfumed by a user equipment includes: receiving (210) from a base station a downlink feedback indication (DFI) signal, where the DFI signal comprises an ACK/NACK indication associated with a first HARQ process defined for a transmission to the base station of an uplink data packet using time slot aggregation. A user equipment is also provided.

16 Claims, 9 Drawing Sheets

(56) References Cited

U.S. PATENT DOCUMENTS

| | | | |
|---|---|---|---|
| 2015/0029917 A1* | 1/2015 | Kim | H04W 52/0209 |
| | | | 370/311 |
| 2017/0055202 A1* | 2/2017 | Uchiyama | H04W 24/10 |
| 2019/0149378 A1 | 5/2019 | Takata et al. | |
| 2019/0268912 A1 | 8/2019 | Myung et al. | |
| 2020/0022073 A1* | 1/2020 | Yang | H04W 76/11 |
| 2021/0409182 A1* | 12/2021 | Lee | H04L 1/1864 |
| 2022/0216955 A1* | 7/2022 | Kim | H04L 1/1861 |
| 2022/0312445 A1* | 9/2022 | Yin | H04L 1/1664 |

FOREIGN PATENT DOCUMENTS

| | | | |
|---|---|---|---|
| WO | 2009137464 A2 | 11/2009 | |
| WO | 2009137464 A3 | 12/2009 | |
| WO | 2018201035 A1 | 11/2018 | |
| WO | 2019006183 A1 | 1/2019 | |
| WO | 2019139713 A1 | 7/2019 | |

OTHER PUBLICATIONS

Ad-hoc Chair (Ericsson), "Chairman's notes of AI 7.2.2 NR-based Access to Unlicensed Spectrum", 3GPP TSG RAN WG1 Meeting #98, R1-1909756, Aug. 26-30, 2019, 9 pages.

First Office Action of the Japanese application No. 2022-543803, issued on Jul. 7, 2023, 6 pages with English translation.

Office Action of the Indian application No. 202227016760, issued on Aug. 24, 2022. 5 pages with English translation.

International Search Report in the international application No. PCT/IB2019/001104, mailed on Jun. 17, 2020.

Written Opinion of the International Search Authority in the international application No. PCT/IB2019/001104, mailed on Jun. 17, 2020.

3GPP TSG-RAN WG1 Meeting #98 R1-1909301, Prague, Czech Republic, Aug. 26-30, 2019, Agenda Item: 7.2.2.2.4, Source: Ericsson, Title: Configured grant enhancement, Document for: Discussion, Decision.

First Office Action of the Chinese application No. 202210693452.7, issued on Apr. 8, 2024. 11 pages with English translation.

* cited by examiner

METHODS AND DEVICES FOR DOWNLINK FEEDBACK INDICATION PROCESSING

CROSS-REFERENCE TO RELATED APPLICATION

This application is a U.S. continuation application of International Application No. PCT/IB2019/001104, entitled "METHODS AND DEVICES FOR DOWNLINK FEEDBACK INDICATION PROCESSING", filed on Sep. 24, 2019, the disclosure of which is hereby incorporated by reference in its entirety.

TECHNICAL FIELD

The present disclosure relates to a method and device for downlink feedback indication processing.

The present disclosure is for example applicable to a telecommunication system such as a 5G (fifth generation) network using the 5G NR (New Radio) as radio access technology (RAT) defined by 3GPP. The present disclosure is applicable to 5G NR-U (NR in unlicensed spectrum) but also to 5G NR (NR in licensed spectrum).

BACKGROUND

The unlicensed spectrum corresponds to a spectrum shared by different communication systems. The communication equipment in the different communication systems can use the spectrum as long as it meets the regulatory requirements set by the country or region on the spectrum, and does not need to apply for a proprietary spectrum authorization from the government.

In order to allow various communication systems that use unlicensed spectrum for wireless communication to coexist friendly in the spectrum, some countries or regions specify regulatory requirements that must be met to use unlicensed spectrum. For example, the communication device follows the principle of "Listen Before Talk (LBT)", that is, the device needs to perform channel sensing before transmitting the signal on the channel Only when the LBT outcome shows that the channel is idle, the device can perform signal transmission; otherwise, the device cannot perform signal transmission. In order to ensure fairness, once a device successfully occupies the channel, the transmission duration cannot exceed the Maximum Channel Occupancy Time (MCOT).

On the unlicensed carrier, for the channel occupation time obtained by the base station (BS), the base station may share the channel occupation time with the user equipment (UE) for transmitting the uplink signal or the uplink channel. In other words, when the base station shares its own channel occupancy time with the UE, the UE can use the LBT mode with higher priority than that used by the UE itself to obtain the channel, thereby obtaining the channel with greater probability.

In NR Rel.15, in order to support ultra-low latency and high reliable service, the configured grant (CG) transmission is supported for uplink PUSCH transmission. The concept of CG is that the base station configures the uplink time frequency resources which are periodically present. The necessary information for UE to prepare the transmission via the PUSCH as well as for the base station to decode the packets received via the PUSCH are configured semi-statically, e.g. TBS, MCS, RV, time frequency resources, periodicity and repetition times. Moreover, the HARQ process ID is bounded with the periodic time-frequency resources and periodicity.

Once the UE has transmitted the CG-PUSCH in the configured resources (radio symbols), the UE will start a timer. Before the timer expires, if the UE received a scheduled DCI scrambled with a particular RNTI and the same HARQ process ID, the UE will understand that the previous HARQ process in CG-PUSCH has failed. Otherwise, the UE will consider the previous HARQ process in CG-PUSCH is successfully received by base station.

The slot aggregation (also referred to herein as time slot aggregation) was introduced in 3GPP NR Rel.15 to enhance the transmission reliability. An uplink data packet to be transmitted by the UE may be divided in several sub-packets corresponding to redundant versions of the uplink data packet. The concept of the slot aggregation is that the same HARQ process will be repeated in multiple consecutive slots with different redundant versions (RV), so that the receiver can conduct combined decoding, leading to a more reliable transmission.

In the current NRU discussion, according to the latest RAN1 #98 agreement, there will be a dedicated downlink feedback indication (DFI) that comprises an acknowledgment indication (ACK/NACK) for each configured HARQ process.

In the slot aggregation case, there is an ambiguity about which sub-packet should be considered with respect to the minimum processing window D to determine the ACK/NACK effectiveness.

There appears thus a need to improve the situation with respect to this ambiguity.

SUMMARY

The scope of protection sought for various embodiments of the invention is set out by the independent claims. The various embodiments/examples, aspects and features, if any, described in this specification that do not fall under the scope of the independent claims are to be interpreted as examples useful for understanding various embodiments of the invention.

According to a first aspect, there is provided a method for downlink feedback indication processing by a user equipment. The method comprises: receiving from the base station a downlink feedback indication, DFI, signal, wherein the DFI signal comprises an ACK/NACK indication associated with a first HARQ process defined for a transmission to a base station of an uplink data packet using time slot aggregation, wherein the transmission of the uplink data packet using time slot aggregation comprises a transmission to the base station of a plurality of sub-packets via a plurality of physical uplink shared channels, PUSCHs, in a plurality of time slots and using one or more radio symbols; obtaining a minimum processing duration D corresponding to a minimum processing time required by the base station for processing the uplink data packet; determining the effective ACK/NACK feedback for the first HARQ process on the basis of the ACK/NACK indication, the minimum processing duration D and a relative time position of at least one of the plurality of sub-packets with respect to the DFI signal.

In one or more embodiments, determining the effective ACK/NACK feedback comprises: determining whether the ACK/NACK indication is a valid ACK/NACK indication for the first HARQ process on the basis of the ACK/NACK indication associated with the first HARQ process, the minimum processing duration D and the relative time position of at least one of the plurality of sub-packets with respect to the DFI signal; using the ACK/NACK indication as the effective ACK/NACK feedback if the ACK/NACK indication is determined to be valid.

In one or more embodiments, determining the effective ACK/NACK feedback comprises, when the ACK/NACK indication is determined to be invalid: waiting for a further DFI signal including a further ACK/NACK indication for the first HARQ process; determining the effective ACK/NACK feedback for the first HARQ process on the basis of the further ACK/NACK indication, the minimum processing duration D and the relative time position of at least one of the plurality of sub-packets with respect to the further DFI signal.

Determining whether the ACK/NACK indication is a valid ACK/NACK indication may be implemented in various ways, and includes, for one or more sub-packets, a time comparison to determine whether the relative time position of the sub-packet with respect to the DFI signal fulfills one or more predetermined conditions. Based on the result of the determination(s) and/or the value of the ACK/NACK indication, it can be determined whether the ACK/NACK indication is a valid ACK/NACK.

In one or more embodiments, determining whether the ACK/NACK indication is a valid ACK/NACK indication comprises: making a first determination for the relative time position of the lastly transmitted sub-packet of the plurality of sub-packets; and based on the first determination, determining that the ACK/NACK indication is valid whatever the value of ACK/NACK indication. Making the first determination may include: determining that a time duration $D_{last}$ between the transmission time corresponding to the transmission of the lastly transmitted sub-packet and the receipt time corresponding to the receipt of the DFI signal is greater than the minimum processing duration D; or, determining that the transmission time corresponding to the transmission of the lastly transmitted sub-packet falls before the start of a processing window which has a duration equal to the minimum processing duration D and ends at the receipt time corresponding to the receipt of the DFI signal;

In one or more embodiments, determining whether the ACK/NACK indication is a valid ACK/NACK indication comprises: making a second determination for the relative time position of the firstly transmitted sub-packet of the plurality of sub-packets, and, based on the second determination, determining that the ACK/NACK indication is invalid whatever the value of ACK/NACK indication.

Making the second determination for the relative time position of the firstly transmitted sub-packet of the plurality of sub-packets may include: determining that a time duration $D_{first}$ between the transmission time corresponding to the transmission of the firstly transmitted sub-packet and the receipt time corresponding to the receipt of the DFI signal is lower than the minimum processing duration D; or determining that the transmission time corresponding to the transmission of the firstly transmitted sub-packet falls after the start of a processing window which has a duration equal to the minimum processing duration D and ends at the receipt time corresponding to the receipt of the DFI signal.

In one or more embodiments, determining whether the ACK/NACK indication is a valid ACK/NACK indication comprises: making a third determination for the relative time position of the lastly transmitted sub-packet of the plurality of sub-packets and the firstly submitted sub-packet of the plurality of sub-packets; and based on the third determination, determining that the ACK/NACK indication is valid whatever the value of ACK/NACK indication.

In one or more embodiments, determining whether the ACK/NACK indication is a valid ACK/NACK indication comprises: making a third determination for the relative time position of the lastly transmitted sub-packet of the plurality of sub-packets and the firstly submitted sub-packet of the plurality of sub-packets; and based on the third determination, determining that the ACK/NACK indication is valid if the value of the ACK/NACK indication is ACK and the ACK/NACK indication is invalid if the value of the ACK/NACK indication is NACK.

Making the third determination for the relative time position of the lastly transmitted sub-packet of the plurality of sub-packets and the firstly submitted sub-packet of the plurality of sub-packets may include: determining that a time duration $D_{last}$ between the transmission time corresponding to the transmission of the lastly transmitted sub-packet and the receipt time corresponding to the receipt of the DFI signal is lower than the minimum processing duration D and that the time duration $D_{first}$ between the transmission time corresponding to the transmission of the firstly transmitted sub-packet and the receipt time corresponding to the receipt of the DFI signal is greater than the minimum processing duration D; or, determining that the transmission time corresponding to the transmission of the lastly transmitted sub-packet falls after the start of a processing window which has a duration equal to the minimum processing duration D and ends at the receipt time corresponding to the receipt of the DFI signal and that the transmission time corresponding to the transmission of the firstly transmitted sub-packet falls before the start of a processing window which has a duration equal to the minimum processing duration D and ends at the receipt time corresponding to the receipt of the DFI signal.

In one or more embodiments, determining whether the ACK/NACK indication is a valid ACK/NACK indication comprises: making a second determination for the relative time position of the lastly transmitted sub-packet of the plurality of sub-packets; and based on the second determination, determining that the ACK/NACK indication is invalid whatever the value of ACK/NACK indication. Making the second determination for the relative time position of the lastly transmitted sub-packet of the plurality of sub-packets may include: determining that a time duration $D_{last}$ between the transmission time corresponding to the transmission of the lastly transmitted sub-packet and the receipt time corresponding to the receipt of the DFI signal is lower than the minimum processing duration D; or determining that the transmission time corresponding to the transmission of the lastly transmitted sub-packet falls after the start of a processing window which has a duration equal to the minimum processing duration D and ends at the receipt time corresponding to the receipt of the DFI signal.

In one or more embodiments, the transmission time corresponding to the transmission of a sub-packet is determined from the user equipment perspective on the basis of the last radio symbol used for transmitting the concerned sub-packet and the receipt time corresponding to the receipt of the DFI signal is determined from the user equipment perspective on the basis of the first radio symbol used for receiving the DFI signal.

In one or more embodiments, the minimum processing duration D is RRC configured or included in the DFI signal.

The embodiments presented here may be combined in various ways.

According to a second aspect, there is provided a device comprising means for performing a method according to the first aspect. The means may comprise a transmitter configured to transmit the uplink data packet using time slot aggregation; and a receiver configured to receive from the base station the DFI signal. The means may comprise one or more processors and one or more memories including computer program code, wherein the at least one memory and computer program code are configured to, with the at least one processor, cause the device to perform one or more steps of the method according to the first aspect. The means may comprise circuitry configured to perform one or more steps of the method according to the first aspect.

According to a third aspect, there is provided a user equipment comprising a device according to the second aspect.

According to another aspect, there is provided a computer readable medium comprising program instructions stored thereon for causing a device to perform the steps of the method according to the first aspect. The computer readable medium may be a non-transitory computer readable medium.

The present invention may find application in radio network with unlicensed spectrum (also referred to as NR-U in the context of the 3GPP standard). More generally, the present invention may find application in any other radio network in which a user equipment performs time slot aggregation and a minimum processing duration is defined by a base station for processing the corresponding transmission.

BRIEF DESCRIPTION OF THE DRAWINGS

Some embodiments are now described, by way of example only, and with reference to the accompanying drawings, in which.

DETAILED DESCRIPTION

Figure 1:
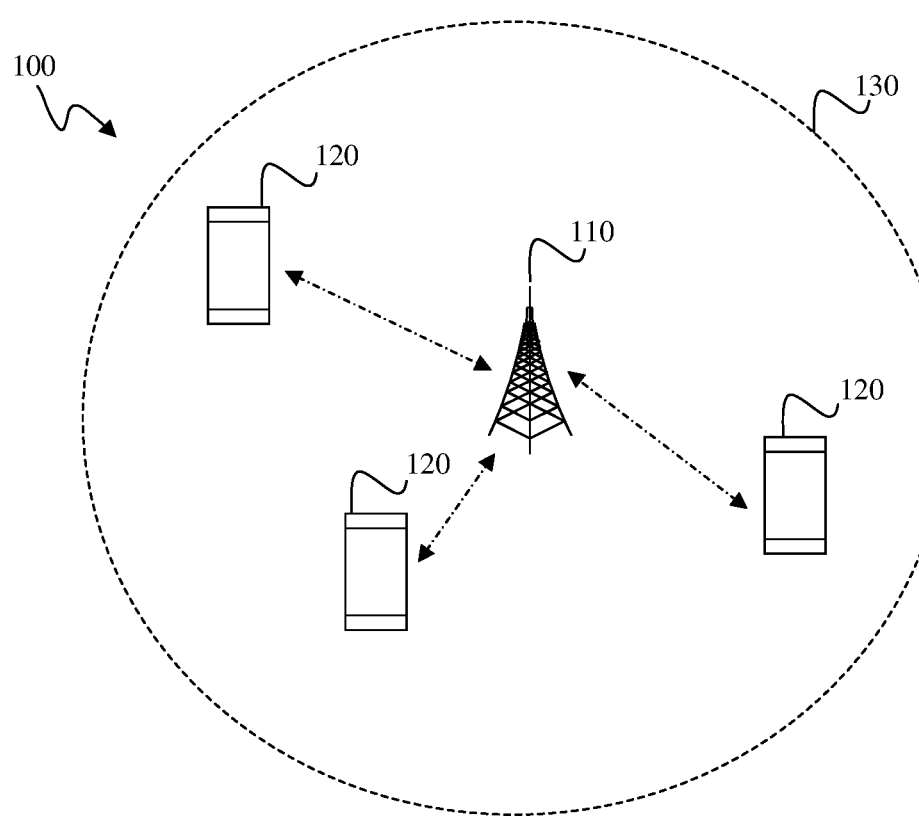
FIG. 1 represents schematically a communication system in which one or more disclosed embodiments may be implemented.

Example embodiments will be described below with reference to functions, engines, block diagrams, flow diagrams, state transition diagrams and/or flowcharts illustrating methods, apparatuses, systems, computer programs, computer readable mediums according to one or more exemplary embodiments.

This invention provides a way for a user equipment to remove the interpretation ambiguity when performing slot aggregated transmission and receiving DFI in which the indicated minimum processing window covers different parts (different sub-packets) of the aggregated slots.

When a UE receives a DFI signal including a ACK/NACK indication for a plurality of sub-packets of a given HARQ process that belongs to slot aggregation (i.e. one HARQ process ID shared with more than one PUSCHs in different slots), the UE may determine an effective ACK/NACK feedback at least in one of the following ways.

The UE determines the effective ACK/NACK feedback of the concerned HARQ process by a first sub-packet that belongs to the HARQ process, the minimum processing duration D (also referred to herein as the minimum processing window D) and the ACK/NACK indication for the above mentioned HARQ process. The minimum processing duration D can be either RRC configured or indicated in the received DFI signal. If the minimum processing window D is semi-statically configured, the base station will not have the flexibility to prioritize the processing CPU for some important services.

The above mentioned first sub-packet via PUSCH is any one of the sub-packets that belongs to the above mentioned HARQ process, for which the relative time position of the first sub-packet with respect to the DFI signal fulfills a predetermined condition. For example, the first sub-packet is any one of the sub-packets that belongs to the above mentioned HARQ process, for which the time duration, from the UE perspective, between the last symbol used for transmitting this sub-packet and the first symbol used for receiving the DFI signal is greater than the minimum processing duration D. In practice, it is sufficient to determine this time duration for the first sub-packet corresponding to the lastly transmitted sub-packet. Example embodiments are described below by reference to FIGS. 3A-3B and FIGS. 4A-4D. Each of the sub-packets HARQ0-PUSCH3 in FIGS. 4A-4D corresponds to the lastly transmitted sub-packet.

If the above mentioned first sub-packet exists, the UE determines the ACK/NACK feedback by directly referring to ACK/NACK indication (valid ACK/NACK indication). If the above mentioned first PUSCH does not exist, the UE determines invalid feedback (invalid ACK/NACK indication). In one or more embodiment, the first sub-packet is the lastly transmitted sub-packet: in this case, if the time duration determined is greater than the minimum processing duration, then all other time duration associated with the other sub-packet will also be greater than the minimum processing duration.

The UE determines the ACK/NACK feedback by a second sub-packet sent via PUSCH and the ACK/NACK indication associated with the HARQ process.

The above mentioned second sub-packet is any one of the sub-packets that belongs to the above mentioned HARQ process and for which the relative time position of the first sub-packet with respect to the receipt of the DFI signal fulfills another predetermined condition. For example, the second sub-packet is any one of the sub-packets that belongs to the above mentioned HARQ process, for which the time duration, from the UE perspective, between the last symbol used for transmitting this sub-packet and the first symbol used for receiving the DFI signal is smaller than minimum processing duration D. In practice, it is sufficient to determine this time duration for the second sub-packet corresponding to the firstly transmitted sub-packet. Example embodiments are described below by reference to FIGS. 3A-3B and FIGS. 4A-4D. Each of the sub-packets HARQ0-PUSCH0 in FIGS. 4A-4D corresponds to the firstly transmitted sub-packet.

If the above mentioned second PUSCH exists, the UE determines an effective ACK feedback if the ACK/NACK indication shows an ACK, and the UE determines invalid feedback if the ACK/NACK indication shows an NACK.

If the above mentioned second PUSCH does not exist, the UE determines the ACK/NACK feedback by directly referring to ACK/NACK indication (valid ACK/NACK indication).

FIG. 1 depicts an example system 100, in accordance with some example embodiments. The system 100 includes a base station 110 and one or more user equipments 120 with the radio cell coverage of the base station. In this example, the base station 110 may be configured in accordance with 5G (having for example an NR, new radio, air interface) or LTE. Although some of the examples herein refer to certain types of base stations, such as 5G and LTE base stations, other types of base stations, including femtocell base stations, home eNB base station, picocell base station, small cell base stations, and/or other radio access points may be used as well. Moreover, although some of the examples herein refer to certain types radio access technologies, such as 5G, NR, and LTE, other types of radio technologies may be used as well.

Figure 2:
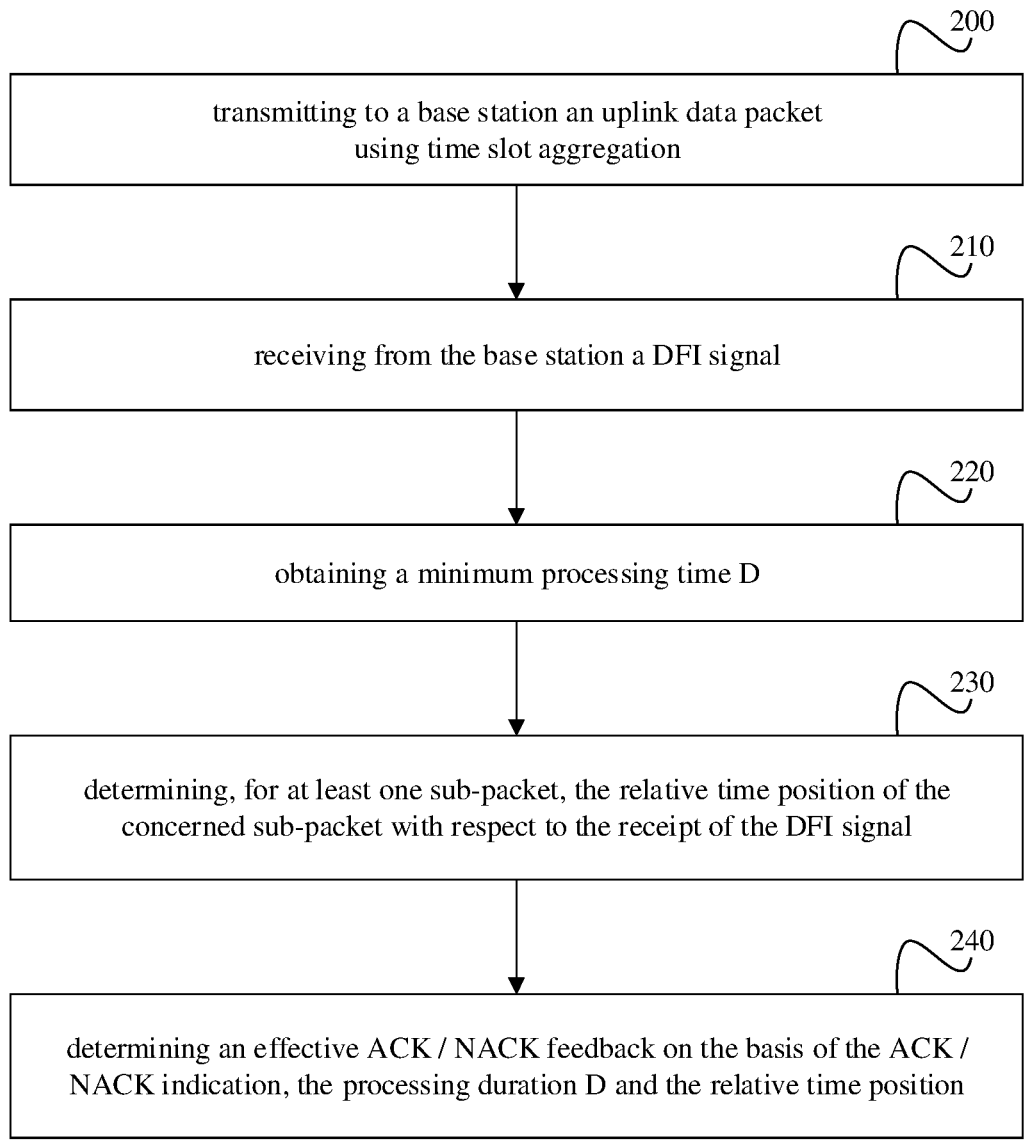
FIG. 2 is a flowchart of an example implementation of a method for downlink feedback indication processing.

FIG. 2 is a flowchart of an example method for downlink feedback indication processing.

The steps of the method may be implemented by a device in a user equipment according to any example described herein. The user equipment is served by a base station in a radio network.

While the steps are described in a sequential manner, the man skilled in the art will appreciate that some steps may be omitted, combined, performed in different order and/or in parallel.

In step 200, the UE transmits to a base station an uplink data packet using time slot aggregation, that is the UE transmits a plurality of sub-packets via a plurality of physical uplink shared channels (PUSCHs) in a plurality of time slots and using one or more radio symbols. It is assumed here that each of the plurality of sub-packets belongs to a first HARQ process.

In step 210, the UE receives from the base station a downlink feedback indication, DFI, signal. The DFI signal comprises an ACK/NACK indication associated with the first HARQ process.

In step 220, the UE obtains a minimum processing duration D corresponding to a minimum processing time required by the base station for processing the uplink data packet. The minimum processing duration D may be RRC (Radio Resource Control) configured or included in the DFI signal. The minimum processing duration D may be configured for one or more uplink data packets or one or more HARQ processes.

In step 230, the UE determines the relative time position (or temporal relationship) with respect to the DFI signal of at least one of the plurality of sub-packets. For example, for the firstly transmitted sub-packet and/or the lastly transmitted sub-packet. The UE performs one or more time comparisons for the selected sub-packet to determine whether the relative time position fulfills one or more predetermined conditions. For example, the UE performs one or more time comparisons to determine the relative time position (temporal relationship) between the transmission time corresponding to the transmission of one or more sub-packets and the receipt time corresponding to the receipt of the DFI signal. For each sub-packet that belongs to the first HARQ process, the time comparison is based on the minimum processing duration D, the receipt time corresponding to the receipt of the DFI signal and the transmission time corresponding to the transmission of the concerned sub-packet. The time comparison may be performed in different ways.

In a first embodiment, the time comparison is performed based on a processing window. The processing window is the window which has a duration equal to the minimum processing duration D and ends at the receipt time corresponding to the receipt of the DFI signal. The receipt time corresponding to the receipt of the DFI signal may be determined from the UE perspective based on the first radio symbol used for receiving the DFI signal. In this first embodiment, the time comparison for a sub-packet includes: obtaining a start time corresponding to the start of a processing window; and comparing the start time corresponding to the start of the processing window with the transmission time corresponding to the transmission of the concerned sub-packet. Comparing the start time corresponding to the start of the processing window with the transmission time corresponding to the transmission of the concerned sub-packet includes determining whether the transmission time falls after the start of the processing window (and thus inside the processing window since the processing window occurs after the start of the transmission of the sub-packets) or before the start of the processing window or at the start of the processing window.

In a second embodiment, the time comparison is performed based on the determination of a time duration. For a sub-packet, the time duration is determined as the difference between the transmission time corresponding to the transmission of a sub-packet and the receipt time corresponding to the receipt of the DFI signal. More precisely, the time duration determined for a sub-packet may be determined, from the UE perspective, as the duration between the last radio symbol used for transmission of the concerned sub-packet and the first radio symbol used for receiving the DFI signal. In this second embodiment, the time comparison performed for a sub-packet includes: obtaining, for the concerned sub-packet, the time duration as the difference between the transmission time corresponding to the transmission of a sub-packet and the receipt time corresponding to the receipt of the DFI signal; and comparing the time duration obtained for the concerned sub-packet with the minimum processing duration D. Comparing the time duration obtained for the concerned sub-packet with the minimum processing duration D includes determining whether the time duration is greater or lower than or equal to the minimum processing duration D.

Each of the first and second embodiments enables to achieve a same comparison result with respect to the identification of the existing temporal relationship and therefore one embodiment may be interchanged with the other. For example, when the transmission time falls after the start of (i.e. inside) the processing window, this corresponds to the same temporal relationship than when the time duration is lower than the minimum processing duration D. For example, when the transmission time falls before the start of the processing window, this corresponds to the same temporal relationship than when the time duration is greater than the minimum processing duration D. Likewise, when the transmission time falls at the start of the processing window, this corresponds to the same temporal relationship than when the time duration is equal to the minimum processing duration D.

In step 230, the UE performs, for each of one or more sub-packets, a time comparison to determine whether the relative time position of the concerned sub-packet with respect to the DFI signal fulfills one or more predetermined conditions. As explained, the time comparison may be based on the time duration or the processing window.

In step 240, the UE determines an effective ACK/NACK feedback for the first HARQ process on the basis of the ACK/NACK indication associated with the first HARQ process, the minimum processing duration D and the relative time position of one or more sub-packets with respect to the DFI signal. In one example, the UE determines an effective ACK/NACK feedback for the first HARQ process on the basis of the ACK/NACK indication associated with the first HARQ process and the result of the time comparison performed in step 230 for one or more sub-packets that belong(s) to the first HARQ process.

The determination of the effective ACK/NACK feedback may include determining whether the ACK/NACK indication is a valid ACK/NACK indication for the first HARQ process on the basis of the ACK/NACK indication associated with the first HARQ process, the minimum processing duration D and the relative time position of at least one of the plurality of sub-packets with respect to the DFI signal. Determining whether the ACK/NACK indication is a valid ACK/NACK indication for the first HARQ process may be based on the ACK/NACK indication associated with the first HARQ process and the result of the time comparison performed in step 230 for one or more sub-packets that belong(s) to the first HARQ process.

In one or more embodiments, the received ACK/NACK indication is used as the effective ACK/NACK feedback if the ACK/NACK indication is determined to be valid. Otherwise, if the ACK/NACK indication is determined to be invalid, the UE waits for a further DFI signal including a further ACK/NACK indication (next ACK/NACK indication) for the first HARQ process. The UE then performs, for each of one or more sub-packets belonging to the first HARQ process, a further time comparison to determine whether the relative time position of the concerned sub-packet with respect to the further DFI signal fulfills one or more predetermined conditions (like in step 230 but using the further DFI signal).

The UE then determines the effective ACK/NACK feedback for the first HARQ process on the basis of the further ACK/NACK indication associated with the first HARQ process, the minimum processing duration D and the relative time position of one or more sub-packets with respect to the further DFI signal. In one example, the UE determines an effective ACK/NACK feedback for the first HARQ process based on the result of the further time comparison and the further ACK/NACK indication (like in step 240 but using the result of the further time comparison based on the transmission of the concerned sub-packet and the further DFI signal).

An example method for determining the effective ACK/NACK feedback will now be described. The method is used in order to determine whether a ACK/NACK indication is a valid ACK/NACK indication, and may be used for example in steps 230 and 240. The method for determining the effective ACK/NACK feedback may include: determining whether a time duration $D_{last}$ between the transmission time corresponding to the transmission of the lastly transmitted sub-packet and the receipt time corresponding to the receipt of the DFI signal is greater than the minimum processing duration D. If the time duration $D_{last}$ is greater than (or equal to) the minimum processing duration D the ACK/NACK indication is determined to be valid whatever the value of ACK/NACK indication. Otherwise if the time duration $D_{last}$ is lower than (or equal to) the minimum processing duration D, determining that the ACK/NACK indication is invalid whatever the value of ACK/NACK indication. The identification of the temporal relationship between the transmission of a sub-packet and the receipt of the DFI signal and associated time comparison is in this example based on the time duration but may be likewise implemented using a time comparison based on the processing window, as explained above.

Figure 3A:
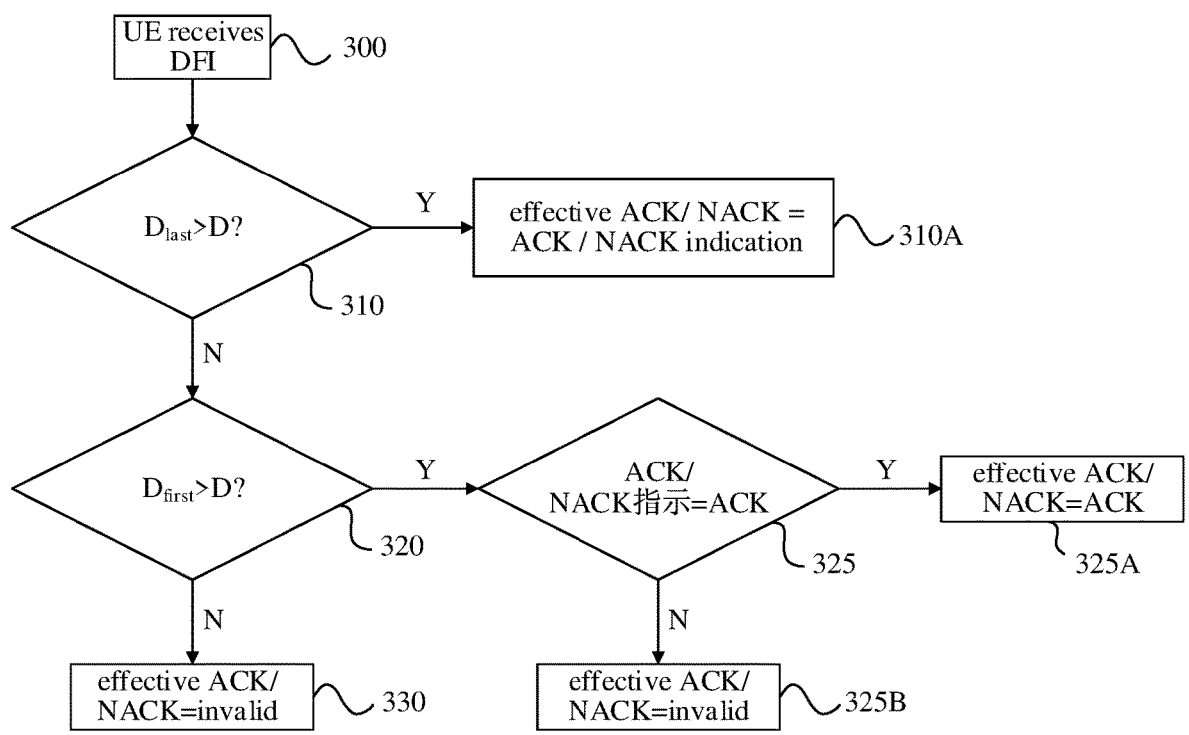
FIG. 3A is a flowchart of an example implementation of a method for downlink feedback indication processing.

FIG. 3A is a flowchart of another example method for determining the effective ACK/NACK feedback. The steps of the method are implemented in order to determine whether a ACK/NACK indication is a valid ACK/NACK indication, and may be used for example in steps 230 and 240.

The steps of the method may be implemented by a device in a user equipment according to any example described herein. The user equipment is served by a base station in a radio network.

While the steps are described in a sequential manner, the man skilled in the art will appreciate that some steps may be omitted, combined, performed in different order and/or in parallel. For example, the order in which the tests of step 310, 320 and 330 may be changed, e.g. starting with the test described in step 320 or 330.

The identification of the temporal relationship between the transmission of a sub-packet and the receipt of the DFI signal and the associated time comparison is here based on the time duration but the method steps may be likewise implemented using a time comparison based on the processing window as explained above.

In step 300, a DFI signal is received by a user equipment from the base station. A first time duration $D_{last}$ between the transmission of the lastly transmitted sub-packet of the plurality of sub-packets and the receipt of the DFI signal is determined. A second time duration $D_{first}$ between the transmission of the firstly transmitted sub-packet of the plurality of sub-packets and the receipt of the DFI signal is determined.

In step 310, it is determined whether the first time duration $D_{last}$ is greater than the minimum processing duration D. If the first time duration $D_{last}$ is greater than the minimum processing duration D, the ACK/NACK indication is determined as being valid whatever the value of ACK/NACK indication (step 310A). Otherwise, if the first time duration $D_{last}$ is lower than the minimum processing duration D, step 320 is executed after step 310. If it is determined in step 310 that the first time duration $D_{last}$ is equal to the minimum processing duration D, then one of steps 310A and 320 may be executed after step 310.

In step 320, it is determined that the first time duration $D_{last}$ is lower than (or equal to) the minimum processing duration D. In step 320, it is determined whether the second time duration $D_{first}$ is greater than the minimum processing duration D. If the first time duration $D_{last}$ is lower than (or equal to) the minimum processing duration D and the second time duration $D_{first}$ is greater than the minimum processing duration D, step 325 is executed after step 320. Otherwise, if the second time duration $D_{first}$ is lower than the minimum processing duration D, step 330 is executed after step 320. If it is determined in step 320 that the second time duration $D_{first}$ is equal to the minimum processing duration D, then one of steps 325 and 330 may be executed after step 320.

In step 325, it is determined whether the value of the ACK/NACK indication is equal to ACK. In step 325, the ACK/NACK indication is determined as being valid if the value of the ACK/NACK indication is ACK (step 325A) and the ACK/NACK indication is determined as being invalid if the value of the ACK/NACK indication is NACK (step 325B).

In step 330, it is determined that the first time duration $D_{last}$ is lower than (or equal to) the minimum processing duration D and that the second time duration $D_{first}$ is lower than (or equal to) the minimum processing duration D. In step 330, the ACK/NACK indication is determined as being invalid whatever the value of ACK/NACK indication.

Figure 3B:
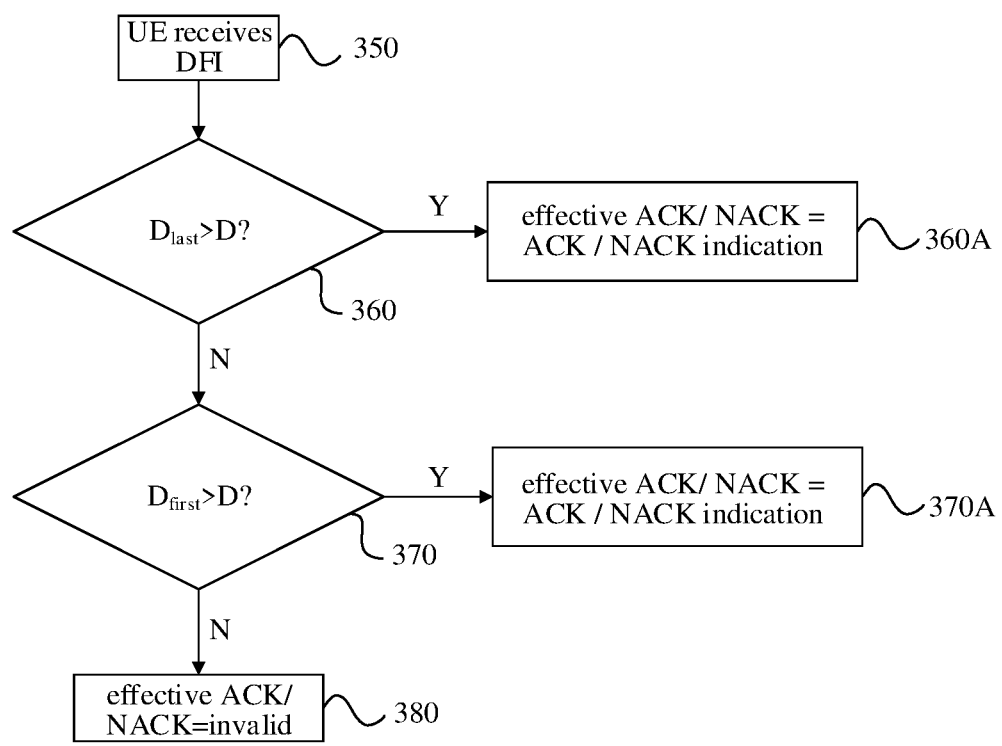
FIG. 3B is a flowchart of an example implementation of a method for downlink feedback indication processing.

FIG. 3B is a flowchart of another example method for determining the effective ACK/NACK feedback. The steps of the method are implemented in order to determine whether a ACK/NACK indication is a valid ACK/NACK indication, and may be used for example in step 240.

The steps of the method may be implemented by a device in a user equipment according to any example described herein. The user equipment is served by a base station in a radio network.

While the steps are described in a sequential manner, the man skilled in the art will appreciate that some steps may be omitted, combined, performed in different order and/or in parallel. For example, the order in which the tests of step 350, 360 and 380 may be changed, e.g. starting with the test described in step 360 or 380.

The identification of the temporal relationship between the transmission of a sub-packet and the receipt of the DFI signal and the associated time comparison is here based on the time duration but the method steps may be likewise implemented using a time comparison based on the processing window as explained above.

In step 350, a DFI signal is received by a user equipment from the base station. A first time duration $D_{last}$ between the transmission of the lastly transmitted sub-packet of the plurality of sub-packets and the receipt of the DFI signal is determined. A second time duration $D_{first}$ between the transmission of the firstly transmitted sub-packet of the plurality of sub-packets and the receipt of the DFI signal is determined.

In step 360, it is determined whether the first time duration $D_{last}$ is greater than the minimum processing duration D. If the first time duration $D_{last}$ is greater than the minimum processing duration D, the ACK/NACK indication is determined as being valid whatever the value of ACK/NACK indication (step 360A). Otherwise, if the first time duration $D_{last}$ is lower than the minimum processing duration D, step 370 is executed after step 360. If it is determined in step 360 that the first time duration $D_{last}$ is equal to the minimum processing duration D, then one of steps 360A and 370 may be executed after step 360.

In step 370, it is determined that the first time duration $D_{last}$ is lower than (or equal to) the minimum processing duration D. In step 370, it is determined whether the second time duration $D_{first}$ is greater than the minimum processing duration D. If the first time duration $D_{last}$ is lower than (or equal to) the minimum processing duration D and the second time duration $D_{first}$ is greater than the minimum processing duration D, the ACK/NACK indication is determined as being valid whatever the value of ACK/NACK indication (step 370A). Otherwise, if the second time duration $D_{first}$ is lower than the minimum processing duration D, step 380 is executed after step 370. If it is determined in step 370 that the second time duration $D_{first}$ is equal to the minimum processing duration D, then one of steps 370A and 380 may be executed after step 370.

In step 380, it is determined that the first time duration $D_{last}$ is lower than (or equal to) the minimum processing duration D and that the second time duration $D_{first}$ is lower than (or equal to) the minimum processing duration D. In step 380, the ACK/NACK indication is determined as being invalid whatever the value of ACK/NACK indication.

Examples will now be described by reference to FIGS. 4A to 4D. In these examples we assume that a UE has transmitted slot aggregation PUSCH transmission with K=3 aggregated slots and that the HARQ process ID=0. Then this UE will receive a DFI signal comprising a ACK/NACK indication for the HARQ process ID=0 and the minimum processing window D (D can be indicated in the DFI signal or RRC configured). Then there may be the following cases. Each of FIGS. 4A to 4D shows the processing window having a duration equal to the minimum processing duration D: the end of this processing window falls on the receipt time of the DFI signal. Each of FIGS. 4A to 4D also shows 3 sub-packets HARQ0-PUSCH0 to HARQ0-PUSCH3.

Case 1: all the aggregated slots, i.e. K PUSCHs are outside the minimum processing window. See FIG. 4A. This case corresponds to steps 310A and 360A previously described. The 3 aggregated slots are here outside the minimum processing window D.

In case 1, when the UE obtains the DFI and D value, it finds out that all the aggregated K slots are outside the minimum processing window D. Thus, the UE will determine that the ACK/NACK indication for HARQ process ID=0 in the DFI signal is valid. When the DFI signal indicates ACK, it means the HARQ process ID=0 is well received by the base station; or when DFI indicates NACK, it means the HARQ process ID=0 is not correctly received by the base station.

Figure 4A:
FIG. 4A to 4D show aspects of downlink feedback indication processing according to examples.
Figure 4B:
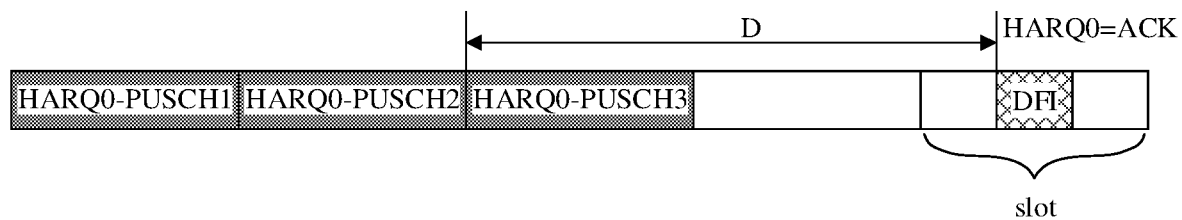

Case 2: Among aggregated slots (K PUSCHs), only M PUSCHs (0<M<K) are outside the minimum processing window D and K-M PUSCHs are inside the minimum processing window D, the DFI signal indicates ACK. See FIG. 4B. This case corresponds to step 325A previously described. In FIG. 4B, M=2 aggregated slots HARQ0-PUSCH1 and HARQ0-PUSCH2 are outside the minimum processing window D.

In case 2, when the UE obtains the DFI signal and D value, the UE finds out that among the aggregated K slots only M PUSCHs (0<M<K) are outside the minimum processing window D. Thus, the UE will understand that the ACK/NACK indication for HARQ process ID=0 in DFI is only valid for partial PUSCHs. In case 2, the DFI signal indicates ACK: it means that the base station has correctly received the HARQ process ID=0 data at least for the M PUSCHs outside the minimum processing window D. This means that the base station may not necessary further exploit the other sub-packets K-M PUSCHs. So that the UE will determine that the HARQ process ID=0 transmission is completed with success and the ACK indication in the DFI signal is considered to be valid.

Figure 4C:
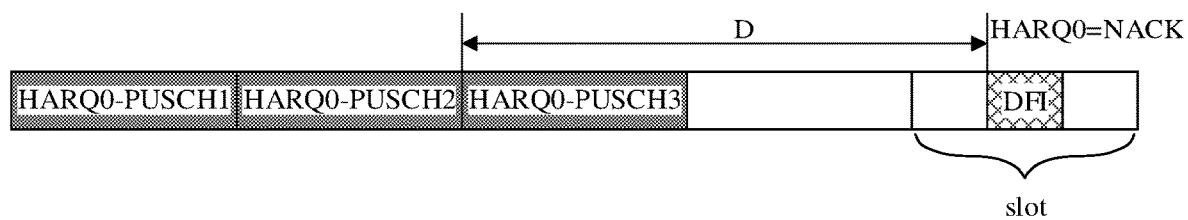
Figure 4D:
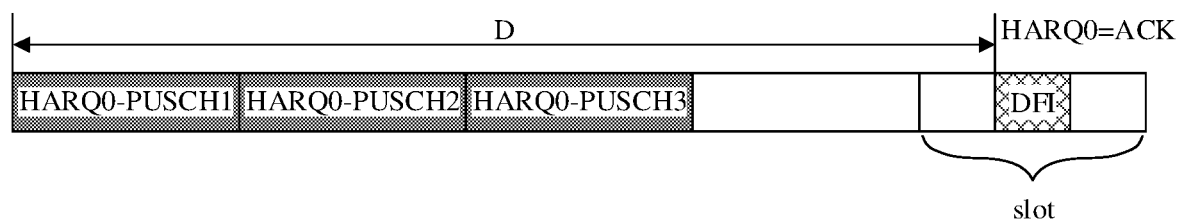

Case 3: Among aggregated slots (K PUSCHs), only M PUSCHs (0<M<K) are outside minimum processing window and K-M PUSCHs are inside the minimum processing window D, the DFI signal indicates NACK. See FIG. 4C. This case corresponds to step 325B previously described. In FIG. 4C, M=2 aggregated slots HARQ0-PUSCH1 and HARQ0-PUSCH2 are outside the minimum processing window D.

In case 3, when the UE obtains the DFI signal and D value, the UE finds out that among the aggregated K slots only M PUSCHs (0<M<K) are outside the minimum processing window D. Thus, the UE will understand that the ACK/NACK indication for HARQ process ID=0 in DFI is only valid for partial PUSCHs. In case 3, the DFI signal indicates NACK: it means that base station has not correctly received the HARQ process ID=0 data from the M PUSCHs outside the minimum processing window D. This means that the base station needs to further exploit the other K-M PUSCHs, that the base station does not have enough time to process yet (as they are inside the minimum processing window D). So that the UE will determine that the ACK/NACK indication for HARQ process ID=0 in the DFI signal not valid.

Case 4: all the aggregated slots, i.e. K PUSCHs are inside the minimum processing window. See FIG. 4D. This case corresponds to steps 330 or 380 previously described.

In case 4, when the UE obtains the DFI signal and D value, the UE finds out that all the aggregated K slots are inside the minimum processing window D. Thus, the UE will determine that the ACK/NACK indication for HARQ process ID=0 in the DFI signal is not valid.

This invention provides way for a UE to remove the interpretation ambiguity when performing slot aggregated transmission and receiving DFI in which the indicated minimum processing window covers different part of the aggregated slots.

The embodiments are not, however, restricted to the 3GPP network that is given herein as an example, but a person skilled in the art may apply the solution to other communication systems A list of acronyms used in this document is provided below

| Acronym | Meaning |
| --- | --- |
| BS | Base station |
| CG | configured grant |
| DFI | downlink feedback indication |
| HARQ | hybrid automatic repeat request |
| LBT | Listen Before Talk |
| LTE | Long Term Evolution |
| LTE-A | Advanced long term evolution |
| NR | New Radio |
| NR-U | New Radio-unlicensed |
| PBCH | Physical Broadcast Channel |
| PDCCH | Physical Downlink Control CHannel |
| PDSCH | physical downlink shared channel |
| PUSCH | physical uplink shared channel |
| RNTI | radio network temporary identifier |
| RV | redundancy version |
| UE | User Equipment |

It should be appreciated by the man skilled in the art that any functions, engines, block diagrams, flow diagrams, state transition diagrams and/or flowcharts herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processing apparatus, whether or not such computer or processor is explicitly shown.

Each described function, engine, block, step can be implemented in hardware, software, firmware, middleware, microcode, or any suitable combination thereof. If implemented in software, the functions, engines, blocks of the block diagrams and/or flowchart illustrations can be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable processing apparatus, create the means for implementing the functions described herein.

Implementations of the various techniques and methods described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium.

In the following, "means configured to perform . . . " a function shall be understood as functional block(s) comprising circuitry that is adapted for performing or configured to perform the function. Moreover, any entity described herein as "means", may correspond to or be implemented as "one or more modules", "one or more devices", "one or more units", etc. Means for performing one or more functions may also comprises at least processor and at least one memory (e.g. in a system or apparatus) for storing computer program code configured to, with the at least one processor, cause the performance (by a system or corresponding device) of the one or more functions.

When provided by a processor, the functions may be provided by a single dedicated processor, by a single shared processor, or by a plurality of individual processors, some of which may be shared. The functions of the various elements shown in the figures, including any functional blocks labeled as "processors", may be provided through the use of dedicated hardware as well as hardware capable of executing software in association with appropriate software.

Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

The term "circuitry" may refer to hardware-only circuit implementations; combinations of circuits and software and/or firmware; or hardware circuit(s) and/or processor(s), such as a microprocessors or a portion of a microprocessor(s), that require or not software and/or firmware for operation, whether the software or firmware is or not physically present. A circuitry may be a general purpose circuitry or a special purpose logic circuitry, e.g., an FPGA (field programmable gate array) or an ASIC (application-specific integrated circuit). The term circuitry also covers, for example and if applicable to the particular claimed element, a baseband integrated circuit, processor integrated circuit or a similar integrated circuit for a base station and/or user equipment.

Some embodiments are also intended to cover computer-readable medium, e.g., digital data storage media, which are machine or computer readable and encode machine-executable or computer-executable programs of instructions, wherein such instructions are configured to cause the execution of some or all of the steps of said above-described methods by a corresponding apparatus, device or system. The computer-readable medium may be, e.g., digital memories, magnetic storage media such as a magnetic disks and magnetic tapes, hard drives, or optically readable digital data storage media.

Embodiments of a computer-readable medium includes, but are not limited to, both computer storage media and communication media including any medium that facilitates transfer of a computer program from one place to another. Specifically, program instructions or computer readable program code to perform embodiments described herein may be stored, temporarily or permanently, in whole or in part, on a non-transitory computer readable medium of a local or remote storage device including one or more storage media.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Figure 5:
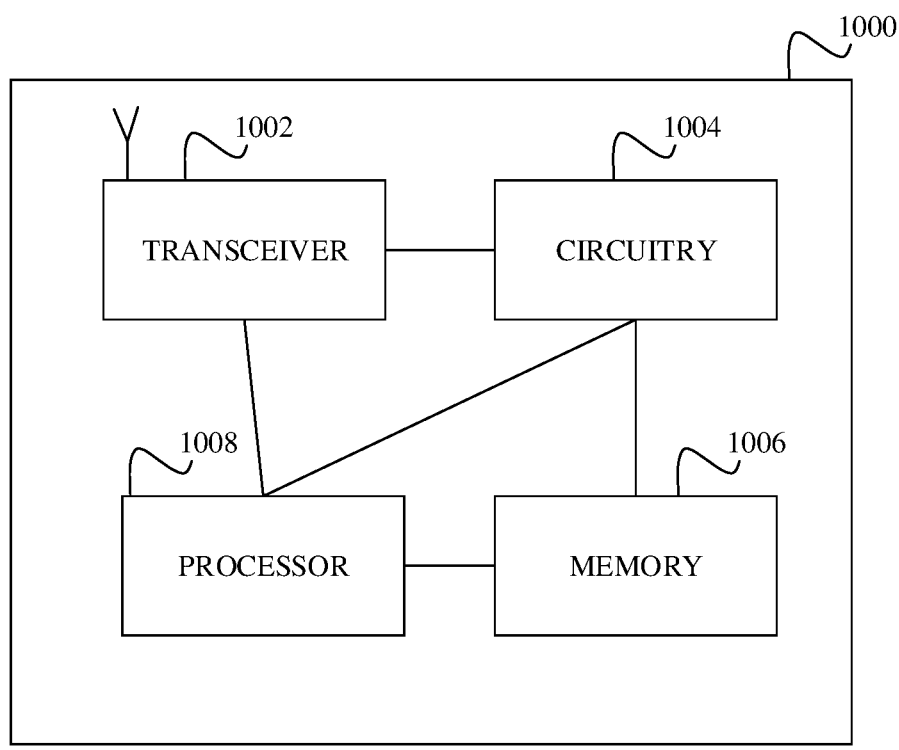
FIG. 5 is a block diagram of a device according to an example implementation.

For completeness, FIG. 5 shows an example block diagram of a device (e.g. user equipment) 1000 according to an implementation. The device 1000 may include, for example, one or more radio transceivers 1002, where each radio transceiver includes a transmitter to transmit radio signals and a receiver to receive radio signals. The device 1000 also includes a circuitry 1004 (e.g. a processor, control unit/entity, controller) to execute instructions or software and control transmission and receptions of signals, and a memory 1006 to store data and/or instructions. The circuitry 1004 may control the radio transceiver 1002 to receive, send, broadcast or transmit signals and/or data. When the circuitry 1004 is implemented in a user equipment, it may be configured to process DFI signal and perform any of the processing steps described herein.

The circuitry 1004 may also make decisions or determinations, generate frames, packets or messages for transmission, decode received frames or messages for further processing, and other tasks or functions described herein. The circuitry 1004, which may be a baseband processor, for example, may generate messages, packets, frames or other signals for transmission via radio transceiver 1002. The circuitry 1004 may control transmission of signals or messages over a radio network, and may control the reception of signals or messages, etc., via a radio network (e.g., after being down-converted by radio transceiver 1002, for example). The circuitry 1004 may be programmable and capable of executing software or other instructions stored in memory or on other computer media to perform the various tasks and functions described above, such as one or more of the tasks or methods described above. The circuitry 1004 may be or include, for example, hardware, programmable logic, a programmable processor that executes software or firmware, and/or any combination of these. Using other terminology, the circuitry 1004 and transceiver 1002 together may be considered as a radio transmitter/receiver system, for example.

In addition, a processor 1008 may execute software and instructions, and may provide overall control for the device 1000, and may provide control for other systems not shown in FIG. 5 such as controlling input/output devices and/or may execute software for one or more applications that may be provided on device 1000.

In addition, a computer-readable storage medium may be provided that includes stored instructions, which when executed by the processor 1008 performs one or more of the functions, steps or tasks described above for the concerned device.

For example, the device 1000 also may include, or be operatively coupled to receive data from or transfer data to, or both, one or more computer-readable storage mediums, e.g., magnetic, magneto-optical disks, or optical disks. A computer-readable storage medium suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

The processor 1008 may be configured to store, read, load and/or otherwise process computer program code stored in a computer-readable storage medium and/or in the memory 1006 that, when executed by the at least one processor, causes the device 1000 to perform one or more steps of a method described herein for the concerned device 1000. Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data.

The processor 1008 may be any suitable microprocessor, microcontroller, integrated circuit, or central processing unit (CPU) including at least one hardware-based processor or processing core.

The memory 1006 may include a random access memory (RAM), cache memory, non-volatile memory, backup memory (e.g., programmable or flash memories), read-only memory (ROM), a hard disk drive (HDD), a solid state drive (SSD) or any combination thereof. The ROM of the memory 1006 may be configured to store, amongst other things, an operating system of the device 1000 and/or one or more computer program codes of one or more computer programs. The RAM of the memory 1006 may be used by the processor 1008 for the temporary storage of data.

The description and drawings merely illustrate the principles of the invention. It will thus be appreciated that those skilled in the art will be able to devise various arrangements that, although not explicitly described or shown herein, embody the principles of the invention and are included within its spirit and scope.

Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for downlink feedback indication processing, performed by a user equipment, the method comprising:
receiving (210) from a base station a downlink feedback indication (DFI) signal, wherein the DFI signal comprises an acknowledgment (ACK)/Negative Acknowledgment (NACK) indication associated with a first Hybrid Automatic Repeat reQuest (HARQ) process defined for a transmission to the base station of an uplink data packet using time slot aggregation, wherein the transmission of the uplink data packet using time slot aggregation comprises a transmission to the base station of a plurality of sub-packets via a plurality of physical uplink shared channels (PUSCHs) in a plurality of time slots and using one or more radio symbols;
obtaining (220) a minimum processing duration D corresponding to a minimum processing time required by the base station for processing the uplink data packet, wherein the minimum processing duration D is Radio Resource Control (RRC) configured or included in the DFI signal; and
determining (240) an effective ACK/NACK feedback for the first HARQ process on the basis of the ACK/NACK indication associated with the first HARQ process, the minimum processing duration D and a relative time position of at least one of the plurality of sub-packets with respect to the DFI signal.

2. The method of claim 1, wherein determining the effective ACK/NACK feedback comprises:
determining whether the ACK/NACK indication is a valid ACK/NACK indication for the first HARQ process on the basis of the ACK/NACK indication associated with the first HARQ process, the minimum processing duration D and the relative time position of at least one of the plurality of sub-packets with respect to the DFI signal; and
using the ACK/NACK indication as the effective ACK/NACK feedback if the ACK/NACK indication is determined to be valid.

3. The method of claim 2, wherein determining the effective ACK/NACK feedback comprises: when the ACK/NACK indication is determined to be invalid,
waiting for a further DFI signal including a further ACK/NACK indication for the first HARQ process; and
determining the effective ACK/NACK feedback for the first HARQ process on the basis of the further ACK/NACK indication, the minimum processing duration D and the relative time position of at least one of the plurality of sub-packets with respect to the further DFI signal.

4. The method of claim 2, wherein determining whether the ACK/NACK indication is the valid ACK/NACK indication comprises:
making a first determination (310, 360) for the relative time position of the lastly transmitted sub-packet of the plurality of sub-packets, wherein making the first determination comprises:
determining that a time duration $D_{last}$ between the transmission time corresponding to the transmission of the lastly transmitted sub-packet and the receipt time corresponding to the receipt of the DFI signal is greater than the minimum processing duration D; or
determining that the transmission time corresponding to the transmission of the lastly transmitted sub-packet falls before the start of a processing window which has a duration equal to the minimum processing duration D and ends at the receipt time corresponding to the receipt of the DFI signal; and
based on the first determination, determining (310A, 360A) that the ACK/NACK indication is valid whatever the value of ACK/NACK indication.

5. The method of claim 2, wherein determining whether the ACK/NACK indication is the valid ACK/NACK indication comprises:
making a second determination for the relative time position of the firstly transmitted sub-packet of the plurality of sub-packets, wherein making the second determination comprises:
determining that a time duration $D_{first}$ between the transmission time corresponding to the transmission of the firstly transmitted sub-packet and the receipt time corresponding to the receipt of the DFI signal is lower than the minimum processing duration D; or
determining that the transmission time corresponding to the transmission of the firstly transmitted sub-packet falls after the start of a processing window which has a duration equal to the minimum processing duration D and ends at the receipt time corresponding to the receipt of the DFI signal; and
based on the second determination, determining (330, 380) that the ACK/NACK indication is invalid whatever the value of ACK/NACK indication.

6. The method of claim 2, wherein determining whether the ACK/NACK indication is the valid ACK/NACK indication comprises:
making a third determination (370) for the relative time position of the lastly transmitted sub-packet of the plurality of sub-packets and the firstly submitted sub-packet of the plurality of sub-packets, wherein making the third determination comprises:
determining that a time duration $D_{last}$ between the transmission time corresponding to the transmission of the lastly transmitted sub-packet and the receipt time corresponding to the receipt of the DFI signal is lower than the minimum processing duration D and that the time duration $D_{first}$ between the transmission time corresponding to the transmission of the firstly transmitted sub-packet and the receipt time corresponding to the receipt of the DFI signal is greater than the minimum processing duration D; or
determining that the transmission time corresponding to the transmission of the lastly transmitted sub-packet falls after the start of a processing window which has a duration equal to the minimum processing duration D and ends at the receipt time corresponding to the receipt of the DFI signal and that the transmission time corresponding to the transmission of the firstly transmitted sub-packet falls before the start of a processing window which has a duration equal to the minimum processing duration D and ends at the receipt time corresponding to the receipt of the DFI signal; and
based on the third determination, determining (370A) that the ACK/NACK indication is valid whatever the value of ACK/NACK indication.

7. The method of claim 2, wherein determining whether the ACK/NACK indication is the valid ACK/NACK indication comprises:

making a third determination (320) for the relative time position of the lastly transmitted sub-packet of the plurality of sub-packets and the firstly submitted sub-packet of the plurality of sub-packets, wherein making the third determination comprises:
  determining that a time duration $D_{last}$ between the transmission time corresponding to the transmission of the lastly transmitted sub-packet and the receipt time corresponding to the receipt of the DFI signal is lower than the minimum processing duration D and that a time duration $D_{first}$ between the transmission time corresponding to the transmission of the firstly transmitted sub-packet and the receipt time corresponding to the receipt of the DFI signal is greater than the minimum processing duration D; or
  determining that the transmission time corresponding to the transmission of the lastly transmitted sub-packet falls after the start of a processing window which has a duration equal to the minimum processing duration D and ends at the receipt time corresponding to the receipt of the DFI signal and that the transmission time corresponding to the transmission of the firstly transmitted sub-packet falls before the start of a processing window which has a duration equal to the minimum processing duration D and ends at the receipt time corresponding to the receipt of the DFI signal;
  based on the third determination, determining (325A, 325B) that the ACK/NACK indication is valid if the value of the ACK/NACK indication is ACK and the ACK/NACK indication is invalid if the value of the ACK/NACK indication is NACK.

8. The method of claim 2, wherein determining whether the ACK/NACK indication is the valid ACK/NACK indication comprises:
  making a second determination for the relative time position of the lastly transmitted sub-packet of the plurality of sub-packets, wherein making the second determination comprises:
    determining that the time duration $D_{last}$ is lower than the minimum processing duration D; or
    determining that the transmission time corresponding to the transmission of the lastly transmitted sub-packet falls after the start of the processing window; and
  based on the second determination, determining that the ACK/NACK indication is invalid whatever the value of ACK/NACK indication.

9. A user equipment (UE), comprising:
  at least one processor (1008); and
  at least one memory (1006) including computer program codes, wherein the at least one memory and computer program codes are configured to, with the at least one processor, cause the UE to:
  receive, through a transceiver, from a base station a downlink feedback indication (DFI) signal, wherein the DFI signal comprises an acknowledgment (ACK)/Negative Acknowledgment (NACK) indication associated with a first Hybrid Automatic Repeat reQuest (HARQ) process defined for a transmission to the base station of an uplink data packet using time slot aggregation, wherein the transmission of the uplink data packet using time slot aggregation comprises a transmission to the base station of a plurality of sub-packets via a plurality of physical uplink shared channels (PUSCHs) in a plurality of time slots and using one or more radio symbols;
  obtain a minimum processing duration D corresponding to a minimum processing time required by the base station for processing the uplink data packet, wherein the minimum processing duration D is Radio Resource Control (RRC) configured or included in the DFI signal; and
  determine an effective ACK/NACK feedback for the first HARQ process on the basis of the ACK/NACK indication associated with the first HARQ process, the minimum processing duration D and a relative time position of at least one of the plurality of sub-packets with respect to the DFI signal.

10. The UE of claim 9, wherein the at least one memory and computer program codes are configured to, with the at least one processor, cause the UE further to:
  determine whether the ACK/NACK indication is a valid ACK/NACK indication for the first HARQ process on the basis of the ACK/NACK indication associated with the first HARQ process, the minimum processing duration D and the relative time position of at least one of the plurality of sub-packets with respect to the DFI signal; and
  use the ACK/NACK indication as the effective ACK/NACK feedback if the ACK/NACK indication is determined to be valid.

11. The UE of claim 10, wherein the at least one memory and computer program codes are configured to, with the at least one processor, cause the UE further to:
  when the ACK/NACK indication is determined to be invalid,
  wait for a further DFI signal including a further ACK/NACK indication for the first HARQ process; and
  determine the effective ACK/NACK feedback for the first HARQ process on the basis of the further ACK/NACK indication, the minimum processing duration D and the relative time position of at least one of the plurality of sub-packets with respect to the further DFI signal.

12. The UE of claim 10, wherein the at least one memory and computer program codes are configured to, with the at least one processor, cause the UE further to:
  make a first determination for the relative time position of the lastly transmitted sub-packet of the plurality of sub-packets, wherein making the first determination comprises:
    determining that a time duration $D_{last}$ between the transmission time corresponding to the transmission of the lastly transmitted sub-packet and the receipt time corresponding to the receipt of the DFI signal is greater than the minimum processing duration D; or
    determining that the transmission time corresponding to the transmission of the lastly transmitted sub-packet falls before the start of a processing window which has a duration equal to the minimum processing duration D and ends at the receipt time corresponding to the receipt of the DFI signal; and
  based on the first determination, determine that the ACK/NACK indication is valid whatever the value of ACK/NACK indication.

13. The UE of claim 10, wherein the at least one memory and computer program codes are configured to, with the at least one processor, cause the UE further to:
  make a second determination for the relative time position of the firstly transmitted sub-packet of the plurality of sub-packets, wherein making the second determination comprises:
    determining that a time duration $D_{first}$ between the transmission time corresponding to the transmission of the firstly transmitted sub-packet and the receipt time corresponding to the receipt of the DFI signal is lower than the minimum processing duration D; or determining that the transmission time corresponding to the transmission of the firstly transmitted sub-packet falls after the start of a processing window which has a duration equal to the minimum processing duration D and ends at the receipt time corresponding to the receipt of the DFI signal; and based on the second determination, determine that the ACK/NACK indication is invalid whatever the value of ACK/NACK indication.

14. The UE of claim 10, wherein the at least one memory and computer program codes are configured to, with the at least one processor, cause the UE further to:

make a third determination for the relative time position of the lastly transmitted sub-packet of the plurality of sub-packets and the firstly submitted sub-packet of the plurality of sub-packets, wherein making the third determination comprises:

determining that a time duration $D_{last}$ between the transmission time corresponding to the transmission of the lastly transmitted sub-packet and the receipt time corresponding to the receipt of the DFI signal is lower than the minimum processing duration D and that the time duration $D_{first}$ between the transmission time corresponding to the transmission of the firstly transmitted sub-packet and the receipt time corresponding to the receipt of the DFI signal is greater than the minimum processing duration D; or determining that the transmission time corresponding to the transmission of the lastly transmitted sub-packet falls after the start of a processing window which has a duration equal to the minimum processing duration D and ends at the receipt time corresponding to the receipt of the DFI signal and that the transmission time corresponding to the transmission of the firstly transmitted sub-packet falls before the start of a processing window which has a duration equal to the minimum processing duration D and ends at the receipt time corresponding to the receipt of the DFI signal; and based on the third determination, determine that the ACK/NACK indication is valid whatever the value of ACK/NACK indication.

15. The UE of claim 10, wherein the at least one memory and computer program codes are configured to, with the at least one processor, cause the UE further to:

make a third determination (320) for the relative time position of the lastly transmitted sub-packet of the plurality of sub-packets and the firstly submitted sub-packet of the plurality of sub-packets, wherein making the third determination comprises:

determining that a time duration $D_{last}$ between the transmission time corresponding to the transmission of the lastly transmitted sub-packet and the receipt time corresponding to the receipt of the DFI signal is lower than the minimum processing duration D and that a time duration $D_{first}$ between the transmission time corresponding to the transmission of the firstly transmitted sub-packet and the receipt time corresponding to the receipt of the DFI signal is greater than the minimum processing duration D; or determining that the transmission time corresponding to the transmission of the lastly transmitted sub-packet falls after the start of a processing window which has a duration equal to the minimum processing duration D and ends at the receipt time corresponding to the receipt of the DFI signal and that the transmission time corresponding to the transmission of the firstly transmitted sub-packet falls before the start of a processing window which has a duration equal to the minimum processing duration D and ends at the receipt time corresponding to the receipt of the DFI signal; and based on the third determination, determine that the ACK/NACK indication is valid if the value of the ACK/NACK indication is ACK and the ACK/NACK indication is invalid if the value of the ACK/NACK indication is NACK.

16. The UE of claim 10, wherein the at least one memory and computer program codes are configured to, with the at least one processor, cause the UE further to:

make a second determination for the relative time position of the lastly transmitted sub-packet of the plurality of sub-packets, wherein making the second determination comprises:

determining that the time duration $D_{last}$ is lower than the minimum processing duration D; or determining that the transmission time corresponding to the transmission of the lastly transmitted sub-packet falls after the start of the processing window; and based on the second determination, determine that the ACK/NACK indication is invalid whatever the value of ACK/NACK indication.

* * * * *